INVENTOR.
SAUL AMAREL
BY [signature]
ATTORNEY

INVENTOR.
SAUL AMAREL
BY Samuel Cole
ATTORNEY

INVENTOR.
SAUL AMAREL
BY Samuel Cohen
ATTORNEY

INVENTOR.
SAUL AMAREL
BY Samuel Cole
ATTORNEY

INVENTOR.
SAUL AMAREL
BY Samuel Cole
ATTORNEY

Jan. 11, 1966 S. AMAREL 3,229,115

NETWORKS OF LOGIC ELEMENTS FOR REALIZING SYMMETRIC SWITCHING FUNCTIONS

Filed Feb. 21, 1962 7 Sheets-Sheet 6

INVENTOR.

SAUL AMAREL

BY [signature]

ATTORNEY

INVENTOR.
SAUL AMAREL
BY Samuel Cole
ATTORNEY

United States Patent Office 3,229,115
Patented Jan. 11, 1966

3,229,115
NETWORKS OF LOGIC ELEMENTS FOR REALIZING SYMMETRIC SWITCHING FUNCTIONS

Saul Amarel, Princeton, N.J., assignor to Radio Corporation of America, a corporation of Delaware Filed Feb. 21, 1962, Ser. No. 174,898
10 Claims. (Cl. 307—88.5)

The present invention relates to networks of logic elements for performing symmetric switching functions.

Symmetric functions constitute an important family of switching functions, used extensively in computers and digital communication equipment. Party check functions, for example, are within this family. Symmetric functions are also used in certain pattern recognition digital networks, where recognition decisions are based on an enumeration of features over a "sensory" field (number of intersections, number of linear segments, number of speech formants, etc.).

An important feature of the present invention is that it permits the realization of symmetric functions of any number of arguments (this number can be arbitrarily large) with networks of simple, readily available, circuit elements (such as three-input majority gates). Gates with large numbers of inputs are not required so that the problem of designing to close or, in many cases, impossibly tight engineering tolerances does not occur. Further, many of the networks of this invention have regular structures and, in view of this, can easily be manufactured in batch processes using planar deposition techniques.

The specific configuration a network according to the present invention takes depends to some extent upon the design requirements. For example, fast circuits take the form of a "tree" network, as discussed in more detail below. Simpler circuits which take somewhat longer to perform their function take the form of cascaded gates. A simple method of designing certain networks having cascaded gates which includes depositing all elements which may be needed and then deleting certain connections according to a simple "design specification" chart is also discussed below. Finally, the invention may take the form of an "adaptable" symmetric function network, that is, a network which can perform any possible symmetric switching function of its arguments in accordance with the values of control voltages applied to the network.

The invention is illustrated in the following drawings of which:

FIGS. 1*a*–1*d* are diagrams to explain the symbols used throughout the figures;

Figure 14A:
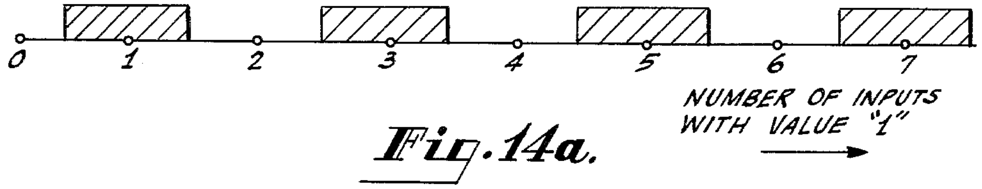
Figure 14B:
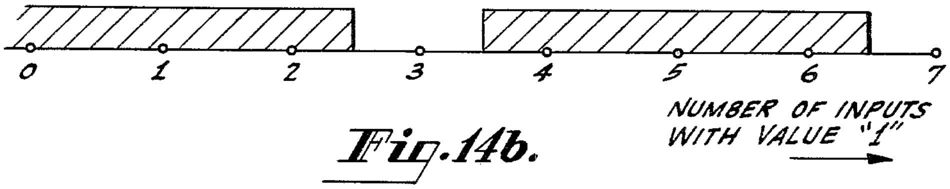
Figure 15:
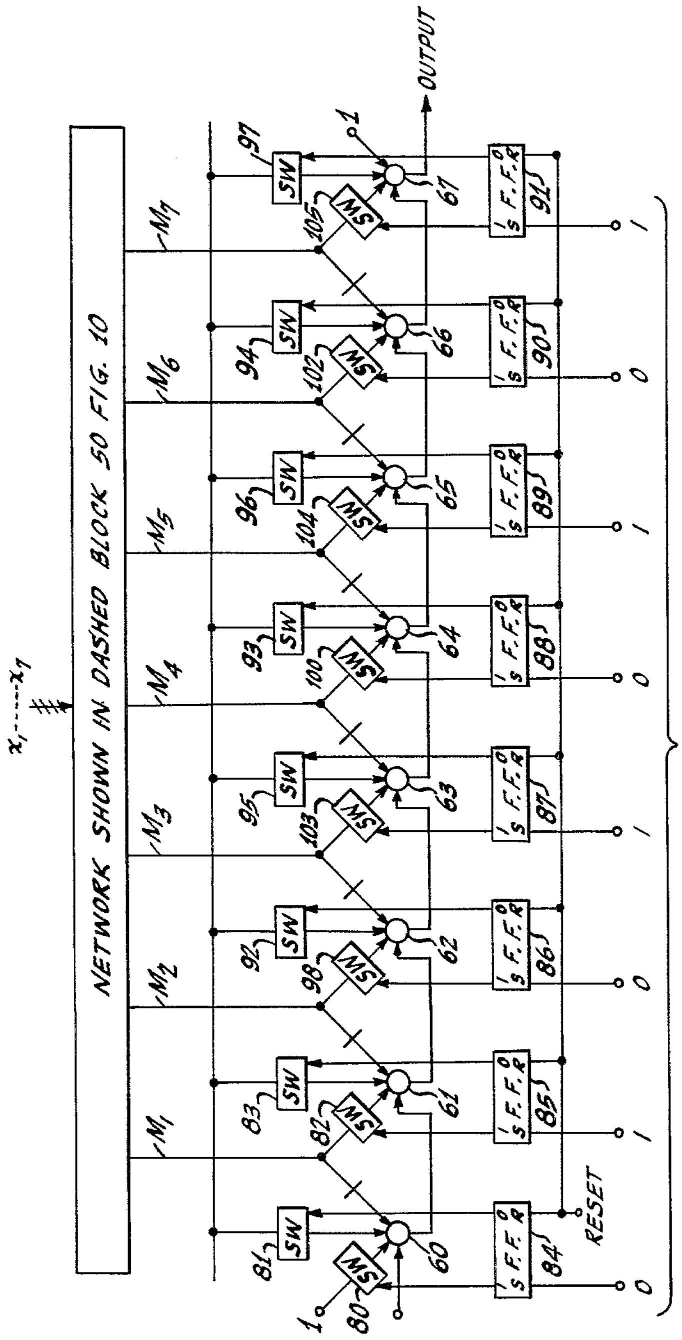

FIGS. 14a and 14*b* are design specification charts for certain symmetric functions. These charts are useful in determining which connections must be deleted in certain cascade networks according to the present invention; and FIG. 15 is a diagram of an adaptable network for generating any symmetric switching function of seven arguments.

The definitions and general discussion which follow are helpful in understanding the figures above. In the general discussion, certain equations are derived. Thereafter, the implementation of these equations by the networks of the present invention is discussed in more detail.

An elementary building block employed throughout the figures is a majority gate. This gate is well-known and may be implemented with diodes, transistors, magnetic devices, cryoelectric circuits or in other ways. The majority gate has an odd number of inputs. It produces an output which is equal to the value of the majority of the inputs. A Boolean equation for a three input majority gate is given in FIG. 1*a*.

As implied above, a majority gate receives signals indicative of binary bits and produces an output signal indicative of a binary bit. When an input or output is at one level, it represents the binary bit "zero" and when it is at another level, it represents the binary bit "one." To simplify the discussion, rather than speaking of electrical signals applied to a gate element or to a network, it is sometimes stated hereafter that "one" or a "zero" is applied to the gate or network.

The networks of the present invention realize symmetric switching functions. A symmetric switching function S has a value "1" only when a predetermined number or predetermined numbers of its arguments have the value "1." (An "argument" is a term employed in mathematics to represent one of the independent variables of a function and it corresponds, in an electrical logic circuit, to an input to the circuit.) For example, a function which has the value "1" only when any five of its $n$ arguments are "1" is a symmetric switching function. Such a function is represented as $S_5(x_1,x_2 \ldots x_n)$. Parity is another example of a symmetric switching function. For example, in the case in which there is a five bit word and check is made for odd parity, the value of the parity function is "1" when one, three, or five of the bits are "1." This function may be represented as $S_{1,3,5}(x_1 \ldots x_5)$. A general symmetric switching function may be represented as follows:

$$S_{j,k,l \ldots p}(x_1,x_2 \ldots x_n) \quad (1)$$

Put into words, the expression above means that S has the value "1" if $j$ or $k$ or $l$ or . . . $p$ of its arguments have the value "1"; otherwise S has the value "0."

A first type of threshold function has the value "1" if *at least i* of its $n$ arguments are "1"; otherwise it has the value "0." In the case in which $$i=\frac{n+1}{2}$$

and $n$ is odd, this threshold function is a majority function as defined previously. This first type of threshold function may be represented by $$M_i(x_1, x_2 \ldots x_n) \quad (2)$$

A second type of threshold function has the value "1" if *at most i* of its *n* arguments are "1"; otherwise it has the value "0." In the case in which $$i=\frac{n-1}{2}$$

and *n* is odd, this threshold function is a minority function. (A minority function is one which has an odd number of arguments and which is equal in value to the value of the minority of the arguments.) The second type of threshold function may be represented as follows:

$$m_i(x_1, x_2 \ldots x_n) \quad (3)$$

In the equations which follow, the parenthetical expressions listing the arguments are omitted for the sake of simplicity. In each case it is to be understood that there are *n* arguments, namely $x_1 \ldots x_n$.

The function $M_i$ means that if at least *i* of the *n* arguments are "1," $M=1$. Accordingly, the function $\overline{M}_i$ means that if at least *i* of the *n* arguments are "1," $\overline{M}_i=0$. Put slightly differently, $\overline{M}_i$ means that if less than *i* of the *n* arguments are "1," then $\overline{M}_i$ is "1." This says the same thing as the threshold function $m_{i-1}$. Therefore, the following identity holds:

$$\overline{M}_i=m_{i-1} \quad (4)$$

By similar analysis, the additional three identities below are found to hold:

$$m_i=\overline{M}_{i+1} \quad (4a)$$

$$\overline{m}_i=M_{i+1} \quad (5)$$

$$M_i=\overline{m}_{i-1} \quad (5a)$$

These three identities and identity (4) above show the "complementarity" between *m* type and M type threshold functions.

If *n* of the *n* arguments of a threshold function $M_n$ have the value "1," then $M_n=1$. In this case, if the same arguments are common to the majority function $M_{n-1}$, then $M_{n-1}$ also equals "1." Similarly, $M_{n-2}$ and $M_{n-3}$ and so on all equal "1," as shown below:

$$M_n \rightarrow M_{n-1} \ldots \rightarrow M_1 \rightarrow (M_0=1) \quad (6)$$

In a similar manner, the following expression is true for the *m* threshold function:

$$m_0 \rightarrow m_1 \ldots \rightarrow m_{n-1} \rightarrow (m_n=1) \quad (7)$$

The arrows in the expressions above indicate logical "implication" (IF . . . THEN). These expressions as well as the complementarity Equations 4, 4*a*, 5 and 5*a* are shown graphically in FIG. 4.

If $i+k$ of the *n* arguments of a threshold function $M_{i+k}$ are "1," then $M_{i+k}=1$. If the same number of arguments have the value "1" in the threshold function $M_i$, then $M_i$ must equal "1," also. Therefore, the following equation holds for the "conjunction" of two threshold functions of type M:

$$M_i \cdot M_{i+k}=M_{i+k} \quad (8)$$

In a similar manner, the following conjunction may be written for *m* threshold functions:

$$m_i \cdot m_{i-k}=m_{i-k} \quad (9)$$

where, in each case, the dot indicates logical "and" and *k* is a positive number.

The equations above are a clue to how one can realize symmetric functions from, for example, M threshold functions. Assume, for example, that it is desired to realize the elementary symmetric function $S_j(x_1 \ldots x_n)$. This function has a value of "1" if exactly *j* of its arguments have the value "1." Put another way, this function has the value "1" if at least *j* of its arguments are "1" *and* also if at most *j* of its arguments are "1." Therefore, $S_j$ can be written as:

$$S_j(x_1 \ldots x_nQ=M_j(x_1 \ldots x_n) \cdot m_j(x_1 \ldots x_n) \quad (10)$$

In Equation 10 above, the arguments and parentheses are included merely as a reminder that each function has *n* arguments, namely $x_1 \ldots x_n$. In the equations which follow, they are again omitted, for the sake of simplicity. Omitting the parentheses, Equation 10 simplifies to $$S_j=M_j \cdot m_j \quad (10a)$$

Equation 4*a* may be employed to substitute for the threshold function $m_j$ of Equation 10*a* its complementary threshold function $\overline{M}_{j+1}$. This gives:

$$S_j=M_j \cdot \overline{M}_{j+1} \quad (11)$$

*j* can take any value from 0 to *n* (0 and *n* included); note that the following convention is adopted: $M_0=1$ and $m_n=1$. For the cases $j=0$ and $j=n$, Equation 11 simplifies to:

$$S_0=\overline{M}_1 \quad (12a)$$

$$S_n=M_n \quad (12b)$$

The symmetric function $S_{j,k, \ldots p}$, can also be expressed as $$S_{j,k, \ldots p}=S_j v S_k v \ldots v S_p \quad (13)$$

where the "*v*" indicates logical "or." Equation 11 may be substituted for the S terms appearing to the right of the "=" sign to give:

$$S_{j,k, \ldots p},=M_j \cdot \overline{M}_{j+1} v M_k \cdot \overline{M}_{k+1} \ldots v M_p \cdot \overline{M}_{p+1} \quad (14)$$

If a symmetric function has the value "1" for *j*, $j+1$, $j+2$, . . . $j+m$ of its arguments (this means that there is a sequence of $m+1$ consecutive numbers among the subscripts of the symmetric function), then a simplification of Equation 14 is possible as follows:

$$S_{[j \leq t \leq j+m]}= M_j \cdot \overline{M}_{j+1} v M_{j+1} \cdot \overline{M}_{j+2} v M_{j+2} \cdot \overline{M}_{j+3} \ldots M_{j+m} \cdot \overline{M}_{j+m+1} \quad (15)$$

where $[j \leqslant t \leqslant j+m]$ refers to the sequence of consecutive numbers of arguments extending from *j* through $j+m$.

The first two terms to the right of the "=" sign in Equation 15 are now considered. According to Equations 4 and 9, $\overline{M}_{j+1} \cdot \overline{M}_{j+2}$ may be substituted for $\overline{M}_{j+1}$. According to Equation 8 $M_j \cdot M_{j+1}$ may be substituted for $M_{j+1}$. Substituting gives the following equation:

$$M_j \cdot \overline{M}_{j+1} v M_{j+1} \cdot \overline{M}_{j+2}=M_j \cdot \overline{M}_{j+1} \cdot \overline{M}_{j+2} v M_j \cdot M_{j+1} \cdot \overline{M}_{j+2} \quad (16)$$

which may be factored and simplified to:

$$M_j \cdot \overline{M}_{j+1} v M_{j+1} \cdot \overline{M}_{j+2}=M_j \cdot \overline{M}_{j+2}[\overline{M}_{j+1} v M_{j+1}]=M_j \cdot \overline{M}_{j+2} \quad (17)$$

If the third and fourth terms $M_j \cdot \overline{M}_{j+2} v M_{j+2} \cdot \overline{M}_{j+3}$ of Equation 15 are considered next, it is found by similar reasoning that they are equivalent to $M_j \cdot \overline{M}_{j+3}$. The process can be continued until the following equation is obtained:

$$M_j \cdot \overline{M}_{j+1} v M_{j+1} \cdot \overline{M}_{j+2} \ldots v M_{j+m} \cdot \overline{M}_{j+m+1}=M_j \cdot \overline{M}_{j+m+1} \quad (18)$$

This leads to the general expression for symmetric function with *q* ranges of consecutive numbers *j* to $j+m_1$, *k* to $k+m_2$, . . . *p* to $p+m_q$:

$$S_{[j \leq t \leq j+m_1,\, k \leq t \leq k+m_2, \ldots p \leq t \leq p+m_q]}= M_j \cdot \overline{M}_{j+m_1+1} v M_k \cdot \overline{M}_{k+m_2+1} v \ldots v M_p \cdot \overline{M}_{p+m_q+1} \quad (19)$$

The expression above calls for the symmetric function S to have the value "1" when the number of its arguments which have values "1" is *j*, $j+1$, $j+2$, . . . $j+m_1$ or *k*, $k+1$, $k+2$, . . . $k+m_2$, and so on. *t* is a variable denoting the number of arguments. A specific example in the case in which $n$ is 9 is:

$$S_{[2\leq t\leq 5,\,7\leq t\leq 8]}$$

This expression says that S has the value "1" when two or three or four or five of the arguments have the value "1" or when seven or eight of the arguments have the value "1." Note that $t$ refers to four arguments in the first case and two arguments in the second case.

Figures 4, 5, 6:
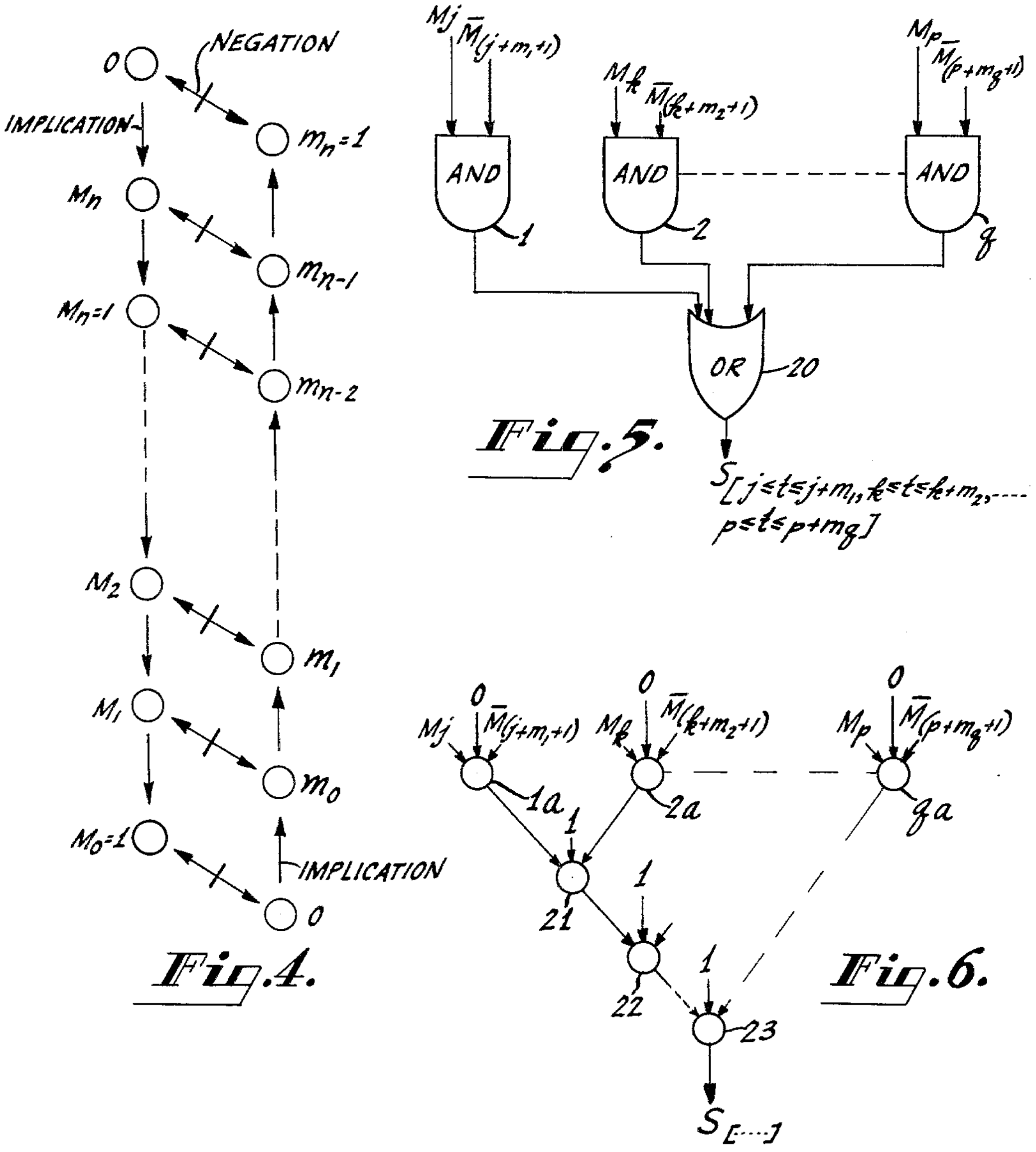
FIG. 4 illustrates relations of implication and complementarity in a certain class of threshold functions. These functions are made use of in this invention to generate symmetric switching functions.
FIG. 5 is a block circuit diagram of a network according to the invention for performing a symmetric switching function.
FIG. 6 is a circuit diagram of a network according to the invention for performing the same switching functions as the network of FIG. 5 but employing majority gates.

The block diagram of a circuit for realizing the general symmetric function of Equation 19 is shown in FIG. 5. The circuit includes $q$ "and" gates 1, 2 . . . $q$. "And" gate 1 receives as inputs binary bits indicative of the threshold functions $M_j$ and $\overline{M}_{j+m_1+1}$; "and" gate 2 receives as inputs binary bits indicative of the threshold functions $M_k$ and $\overline{M}_{k+m_2+1}$; "and" gate $q$ receives as inputs binary bits indicative of threshold functions $M_p$ and $\overline{M}_{p+m_q+1}$. The "and" gates apply their output to a $q$ input "or" gate 20 which produces the desired symmetric function.

A three input majority gate performs the "and" function for two of the inputs if the third input is always maintained at a value indicative of the binary bit "zero." Accordingly, in the circuit of FIG. 5, there can be substituted for "and" gates 1, 2 . . . $q$, three input majority gates 1$a$, 2$a$ . . . $qa$ as shown in FIG. 6.

A three input majority gate acts as an "or" gate for two of the inputs when the third input is maintained at a value indicative of the binary bit "one." Therefore, there can be substituted for the single $q$ input "or" gate 20 of FIG. 5 a group of majority gates, some of which are shown at 21, 22 and 23, which perform a similar function. In each case, one of the inputs to the majority gate is a "1."

Nothing has been said as yet as to how one obtains signals indicative of the threshold functions $M_j$ . . . $M_p$ and so on. A preferred way of doing this in the systems of the present invention is to employ the networks described in application Serial No. 142,873, filed October 4, 1961, now Patent No. 3,162,774 by Robert O. Winder and assigned to the same assignee as the present application. The Winder application discusses networks for producing any desired threshold function $t$ out of $n$ or, as would be represented here, $M_t(x_1,x_2 \ldots x_n)$. At intermediate points in the Winder networks there can be made available values of threshold functions from 1 out of 1 through $t$ out of $n$ where $t$ is any integer from 1 to $n$. A circuit employing three input majority gates for realizing these various threshold functions is shown in Winder's FIGURE 4. A more general circuit for realizing these threshold functions employing $n$ input gates is discussed beginning at page 11 of the Winder application. A specific network employing three input majority gates and having nine input signals $x_1 \ldots x_9$ is shown in FIG. 3 of the present application and in FIGURE 3 of the Winder application.

Figures 1A, 1B, 1C, 1D, 2, 3:
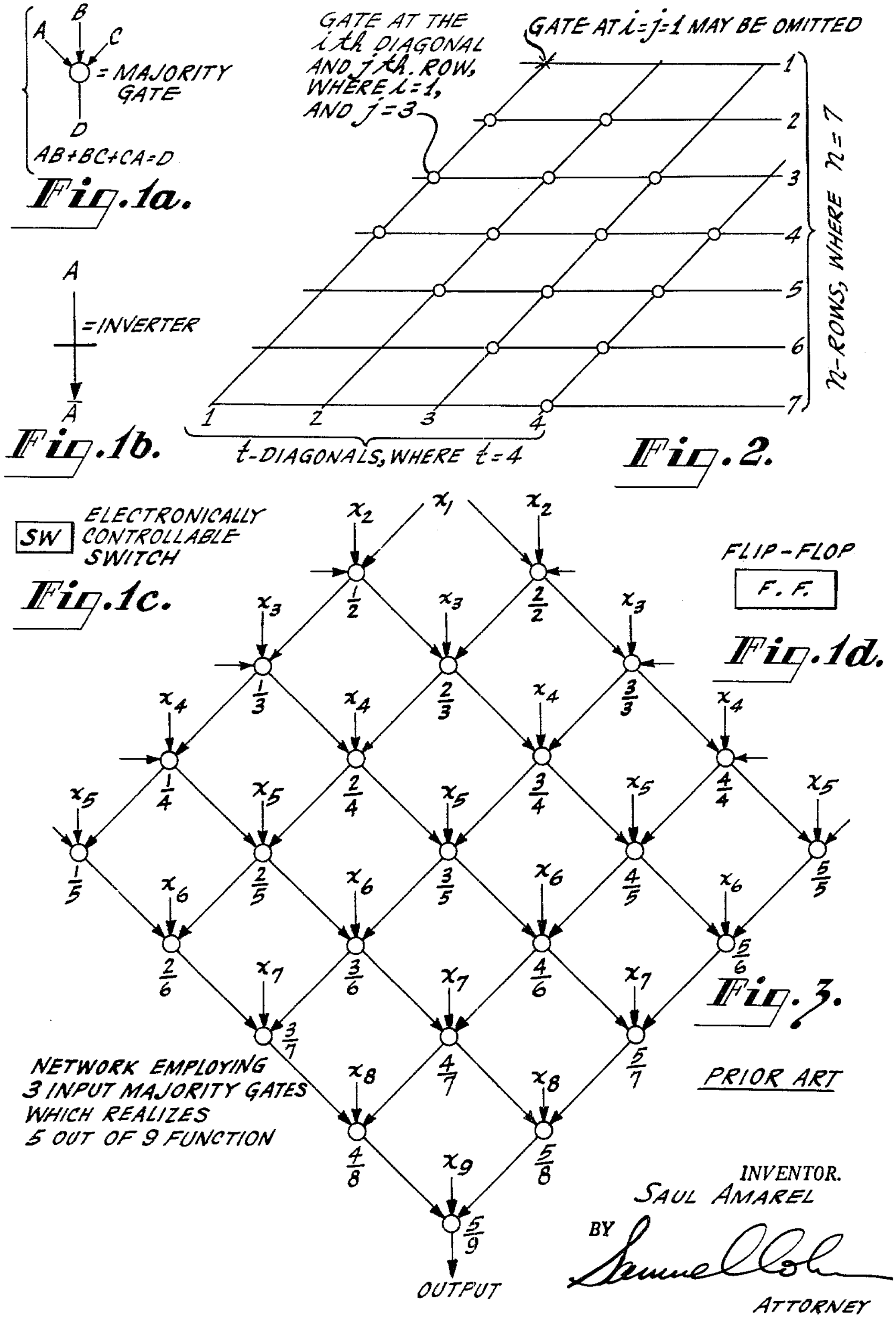
FIG. 2 is a drawing which is useful in explaining the location of various gates in the networks of the invention.
FIG. 3 is a schematic drawing of a prior art logic network which realizes a 5 out of 9 threshold function. A portion of this network may be employed in the symmetric switching function networks of the present invention.

The way in which the various gates in the network of FIG. 3 are identified is shown in the sketch of FIG. 2. Each gate lies on a given diagonal and in a given row. For example, the gate legended 2/3 in FIG. 3 lies on diagonal 2 and in row 3. This gate receives as inputs the outputs of the 1/2 and 2/2 gates and the signal $x_3$. The output produced by the 2/3 gate corresponds to the 2 out of 3 threshold function of the arguments $x_1$, $x_2$, $x_3$. In the terminology of the present equations, this would be represented as $M_2(x_1,x_2,x_3)$.

Figure 7:
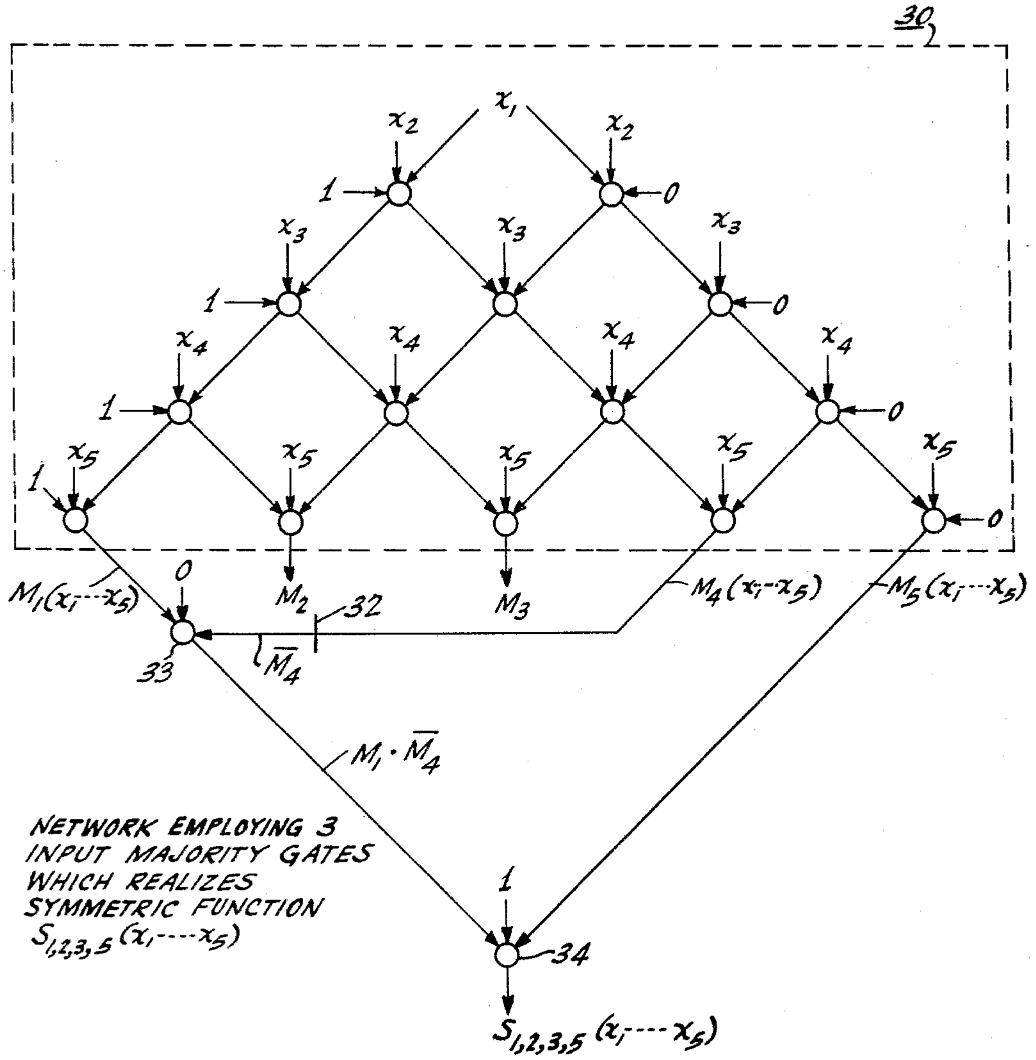
FIG. 7 is a network according to the present invention for realizing one particular symmetric function.

The use of a portion of the network of FIG. 3 to generate the M type of threshold functions which are required as inputs to a specific implementation of the circuits of FIGS. 5 and 6 is shown in FIG. 7. The symmetric function to be implemented in $S_{1,2,3,5}(x_1 \cdot x_2 \ldots x_5)$. Equations 19 and 12 indicate that this symmetric function may be represented in terms of M type threshold functions as follows:

$$S_{1,2,3,5}(x_1 \ldots x_5)=M_1\cdot\overline{M}_4 v M_5 \qquad (20)$$

In Equation 20 above, for the sake of simplicity, the parenthetical expressions $(x_1 \ldots x_5)$ have been omitted from the right side of the equation, however, it is to be understood that here and in the equations following, the same arguments are common to both sides of the equation. Thus, since the symmetric function has five arguments, each threshold function also has five arguments in the case of Equation 20.

The $M_1$ and $M_5$ threshold functions are available as outputs from the fifth row of the network of FIG. 3. Accordingly, this much of the network of FIG. 3 is shown in FIG. 7 within the dashed block 30. The remainder of the network is not needed and may be disconnected. Further, if desired, gates 2/5 and 3/5 and 2/4 may be deleted. The term $\overline{M}_4$ required can be obtained by placing an inverter 32 in series with the output $M_4$ of row 5 of the network. In practice, a separate inverter 32 may be used or a majority gate element may be employed which is capable of producing both the binary bit and its complement. For example, in the case of majority gates implemented with magnetic cores, one might employ a winding in one direction on the core for producing a binary bit output and a winding in the opposite direction on the core for producing its complement. In the case of a transistorized majority gate, bits and their complements can be simulated by obtaining signals at opposite ends of a transformer or obtaining one signal from the emitter circuit and another from the collector circuit and so on.

Returning to FIG. 7, Equation 20 indicates that $M_1$ and $\overline{M}_4$ must be combined in an "and" circuit. Such a circuit is shown at 33 and consists of a three input majority gate one input of which is always maintained at a value corresponding to the binary bit "zero." Equation 20 also indicates that the output of the "and" gate 33 and $M_5$ should be applied to an "or" circuit. The latter appears at 34 and consists of a three input majority gate one of whose inputs is always maintained at a value indicative of the binary bit "one."

Figure 8:
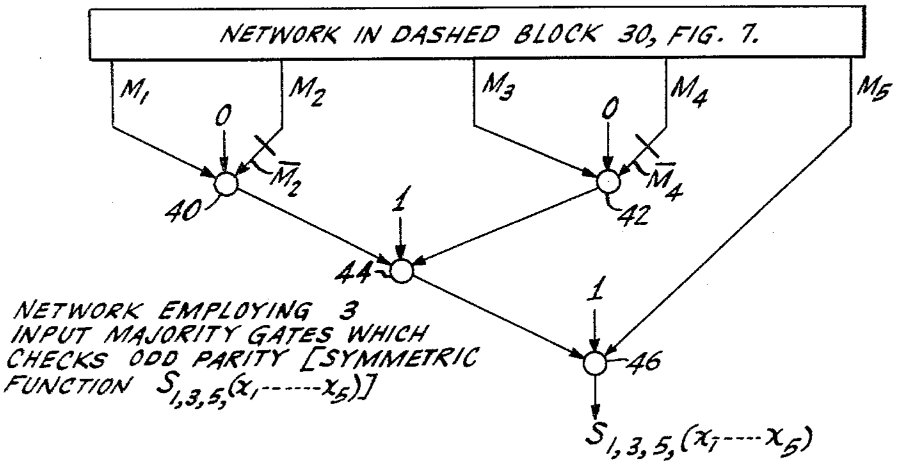
FIG. 8 is a network according to the present invention for realizing a particular odd parity function.

A second implementation of a specific symmetric function is shown in FIG. 8. This network synthesizes the odd parity function for five arguments. This function may be represented by the following equation:

$$S_{1,3,5,}(x_1 \ldots x_5)=M_1\cdot\overline{M}_2 v M_3\cdot\overline{M}_4 v M_5 \qquad (21)$$

The implementation of the equation requires two "and" gates 40 and 42 and two "or" gates 44 and 46. As in the previous example, the gates employed are majority gates, the "and" gates receiving the binary bit "zero" continuously and the "or" gates receiving the binary bit "one" continuously.

The networks of FIGS. 7 and 8 are known herein as tree networks. An important advantage of these networks is that they require a smaller amount of time to produce the desired symmetric function than the cascaded networks to be discussed shortly. Another advantage both of this configuration and of the cascaded configuration is that all majority gate elements of the network are identical and may be deposited at the same time by mass deposition techniques. If desired, standard groups of majority gates interconnected in some predetermined way may be laid down to start with. Thereafter, certain of the connections may be deleted to produce the desired symmetric function. This is discussed in greater detail shortly in connection with the cascaded networks.

Figure 9:
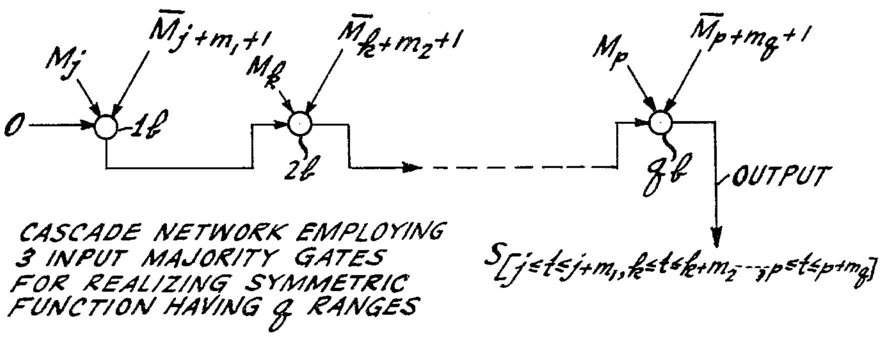
FIG. 9 is a network for realizing the same symmetric function as the network of FIG. 6 but with the majority gates connected in cascade rather than in a tree arrangement.

A generalized cascaded network for realizing the symmetric function of Equation 19 is shown in FIG. 9. The M and $\overline{M}$ inputs to the network are preferably taken from Winder's threshold networks as already discussed. However, now rather than applying the outputs of the majority gates to "or" gates, they are instead applied as inputs to the succeeding majority gates. For example, the output of gate 1$b$ serves as an input to gate 2$b$. The output of gate 2$b$ would serve as an input to the next gate 3$b$ (not shown). The last gate $qb$ receives as an input the output of the immediately preceding gate, namely $q-1(b)$ (not shown).

The cascaded realization of FIG. 9 is justified by the implication properties of the threshold functions set forth in Equations 6 and 7 and FIG. 4. It is assumed, in the analysis which follows, that $j<j+m_1<k<k+m_2 \ldots <p<p+m_q$. Three typical cases are assumed.

In the first case assume that the number $t$ of arguments having the value "1" is in the first range $j\leq t\leq j+m_1$. In other words, at least $j$ of the arguments have the value "1" and at most $j+m_1$ of the arguments have the value "1." In this case, both of the inputs $M_j$ and $\overline{M}_{j+m_1+1}$ to gate 1$b$ have the value "1" (see Equation 18). Therefore, the first gate 1$b$ produces a "1" output. But $k$ is larger than $j+m_1$. Therefore, there are not at least $k$ of the arguments which have the value "1" and $M_k=0$. Now $\overline{M}_{k+m_2+1}=m_{k+m_2}$ (see Equation 4$a$). $k+m_2$ is larger than $j+m_1$. Therefore, there are not more than $k+m_2$ arguments which have the value "1" and $m_{k+m_2}=1=\overline{M}_{k+m_2+1}$. To summarize, of the three inputs to gate 2$b$, the first (the output of gate 1$b$) and third ($\overline{M}_{k+m_2+1}$) have the value "1" and the second ($M_k$) has the value "0." Therefore, majority gate 2$b$ also has the output of value "1." By similar reasoning, it can be shown that all subsequent gates through the last majority gate $qb$ also produce an output "1."

As a second example, asume that the number $t$ of inputs which have the value "1" is in an intermediate range, say $k\leq t\leq k+m_2$. Now $M_k$ and $\overline{M}_{k+m_2+1}$ both have the value "1," and the output of gate 2$b$ has the value "1." The "1" output of this gate propagates to the right in the manner already discussed in the output of the last gate $qb$ is also "1."

In the third example, assume that $t$ of the arguments with the value "1" is between the ranges, say $j+m_1<t<k$. Now $\overline{M}_{j+m_1+1}$ has the value "0" and the output of the first gate 1$b$ is "0." From the assumption made, it is clear that $M_k$ has the value "0" and since the output of the first gate is also "0," two of the inputs to the second gate 2$b$ are "0." Therefore, the second gate produces an output "0." It is also clear from the implication expression that the other M bits feeding gates to the right of 2$b$ have the value "0." Also, each gate to the right of gate 2$b$ receives a "0" from the preceding gate. Therefore, each gate to the right of gate 2$b$ produces an output "0" and the last gate also produces an output "0."

An advantage of the cascade network of FIG. 9 over the tree networks previously described is that, in general, it requires about half the number of gates as the tree arrangement. Further, it is somewhat more regular than the tree network. However, in the cascade arrangement an output is not obtained until the signal travels through all of the cascade gates. If there are $q$ gates therefore, the delay in the network is $q$ times the delay of each gate. (In the case of the tree network the delay in the network is roughly $\log_2 q$ times the delay of each gate.)

Some specific implementations of cascade symmetric networks for realizing switching functions are shown in FIGS. 10–13. The network of FIG. 10 implements the odd parity-check, symmetric function for seven arguments as shown below:

$$S_{[1,3,5,7]}(x_1 \ldots x_7) = M_1\cdot\overline{M}_2 v M_3\cdot\overline{M}_4 v M_5\cdot\overline{M}_6 v M_7 \quad (22)$$

The portion of the network within dashed block 50 is a portion of the Winder threshold network. The threshold functions $M_1, M_2 \ldots M_7$ are available at the output of the network within block 50. These are combined in a cascade arrangement which include four majority gates 52, 54, 56 and 58. The three inputs to the first gate are 0, $M_1$ and $\overline{M}_2$. Gates 54, 56 and 58 receive as one input the output of the preceding gate. Gate 54 receives as second and third inputs $M_3$ and $\overline{M}_4$. Gate 56 receives as second and third inputs $M_5$ and $\overline{M}_6$. Gate 58 receives as second and third inputs $M_7$ and 1. It can be shown by an analysis similar to that discussed above for the cascade network of FIG. 9 that FIG. 10 implements the function expressed in Equation 22.

Figure 10:
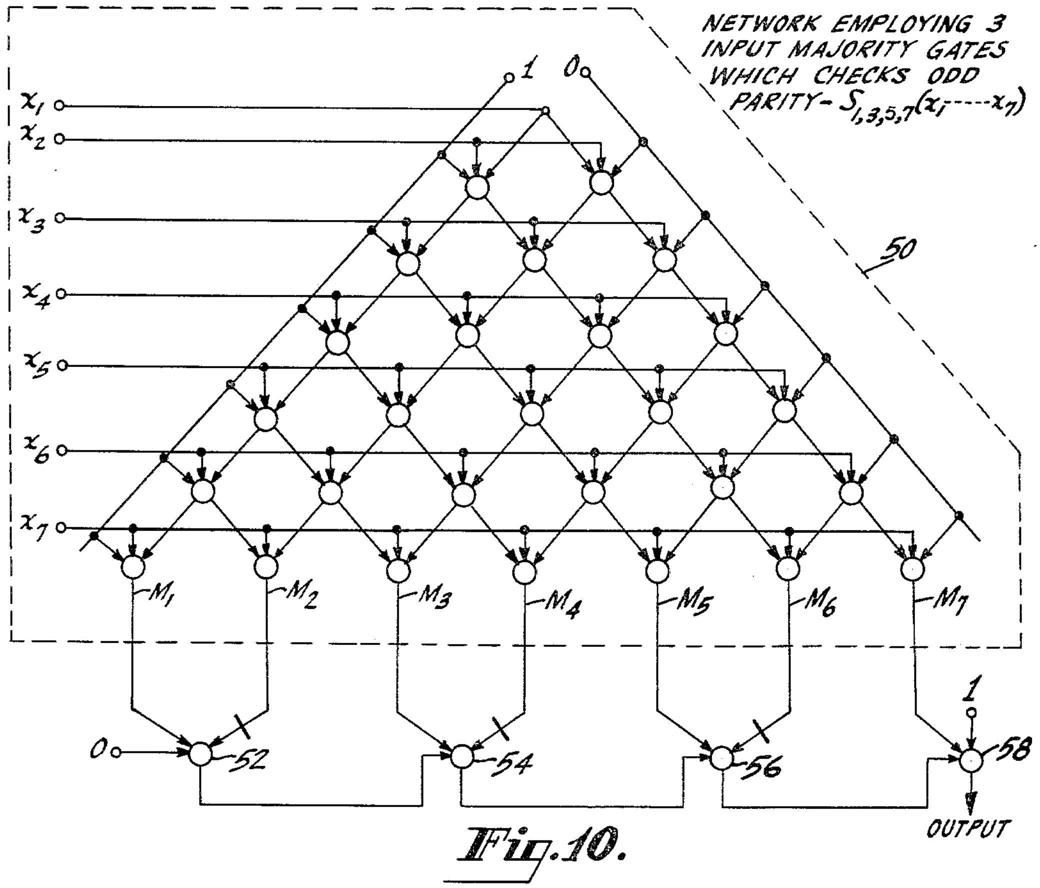
FIG. 10 is another network according to the present invention for realizing an odd parity function.
Figure 11:
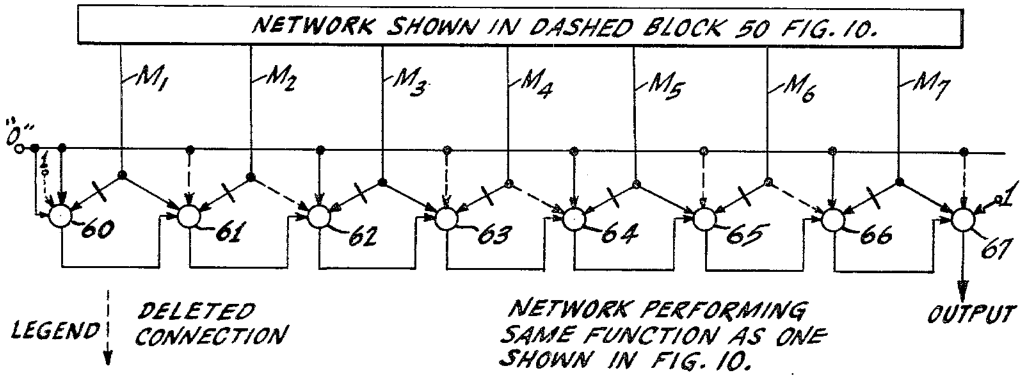
FIG. 11 is a network for realizing the same function as the network of FIG. 10 but made in somewhat different ways.

The circuit of FIG. 11 implements the same function as the one of FIG. 10. It includes a regular array of eight majority gates 60–67, respectively. Initially, all gates have four input connections and one output. All gates are connected to the 0 line and all gates except the first and last receive an $M_j$ input and a $\overline{M}_{j+1}$ input. The first gate 60 receives a $\overline{M}_1$ input and a "1" input. It also receives a second "0" input. The last gate 67 receives an $M_7$ input and a "1" input. In the process of manufacturing the network, certain of the connections are deleted as, for example, by abrading the connection or stamping a hole through the connection or by other means. In the network of FIG. 11, the "0" input connection is removed from the first, third, fifth and seventh gates, that is, gates 61, 63, 65, and 67. The "1" connection is removed from gate 60. The M connection is removed from gates 62, 64, and 66.

The network which results from the process above is shown in FIG. 11. By reasoning similar to that given in connection with the general cascade network of FIG. 9, it can be shown that the network of FIG. 11 realizes exactly the same function as the one of FIG. 10. Important advantages of the network of FIG. 11 are its regularity and the fact that it can easily be manufactured.

A generalized procedure for manufacturing a network such as the one shown in FIG. 11 without the designer having to go through the mathematics involved is shown in FIG. 14. This figure can be considered as a design specification chart for a particular symmetric switching function. A number $n+1$ of equally spaced points are placed along a line, where $n$ is the number of arguments. A cross-hatched area is drawn over each point in the line for which the symmetric function has the value "one." FIG. 14$a$ is a graph of the odd parity function. As this function has the value "1" for values 1, 3, 5, 7 of $j$, a cross-hatched square is drawn over 1, 3, 5, and 7.

The design specification chart tells the manufacturer which connections are to be deleted from the cascade gates previously laid down. As shown in FIG. 11, there are $n+1$ gates laid down, namely 60–67. Gate 60 corresponds to the "0" position of the specification chart of FIG. 14$a$. Gate 61 corresponds to the "1" position and so on. The convention is adopted that one of two possible connections will be removed from each gate. These are the "0" connection or the M connection (in the case of the "0" gate 60 the M connection is actually a "1" connection). Wherever a cross-hatched area appears in the design specification of FIG. 14$a$, the "0" connection must be deleted. Wherever a clear area appears in the specification chart of FIG. 14$a$, an M connection must be deleted (in the case of the "0" gate, the "1" connection must be deleted).

Applying the technique above to the circuit of FIG. 11, it is seen that the "0" connection must be removed from the first, third, fifth and seventh gates, that is, from the gates 61, 63, 65 and 67. Similarly, the M connection must be removed from the zero'th, second, fourth and sixth gates, namely gates 60, 62, 64 and 66. It is seen that the network of FIG. 11 does conform with these rules.

In a practical process of manufacturing a network according to a design specification chart, first all of the gates which are possibly needed are laid down as, for example, by a mass deposition technique. In the case of an arrangement such as shown in FIG. 11, this includes all of the gates within dashed block 50 and the eight gates 60–67. All connections are made to all gates. Next, a template is made according to the design specification chart for the particular symmetric function desired. The template includes areas which lie over the "0" connections to the gates and other areas which lie over the M ("1" in the case of gate 60) connection to the gates. Then selected ones of these are cut out in accordance with the rules already laid down. The completed template is then laid over the gates and used as a guide to remove the connections which appear in the cut out areas of the template.

The circuits of FIGS. 10 and 11 are permanently connected to perform one particular type of symmetric switching function. The circuit of FIG. 15 may be classed as an "adaptable" (sometimes also known as an "adjustable," "flexible," or "adaptive") circuit. It is capable of performing any desired symmetric switching function of seven arguments. The same principles can, of course, be employed to realize any symmetric switching function of any number such as $n$ of arguments.

The circuit of FIG. 15 is similar to the one of FIG. 11 and the same reference numerals are employed for similar elements. However, rather than having an abradable connection between the "0" line connection to each gate and between the M line connection to each gate, there is instead an electronically controllable switch. For example, in the case of gate 60 there is a switch 80 between the 1 input terminal and gate 60 and a switch 81 between the 0 line and gate 60. In the case of gate 61 there is a switch 82 between the $M_1$ line in the gate and the switch 83 between the 0 line in the gate and so on. Each of the switches may be opened by applying a "0" control signal to the switch and closed by applying a "1" control signal to the switch. The control signals are obtained from the flip-flops 84 through 91. A set flip-flop produces a "1" at its 1 output terminal and "0" at its 0 output terminal; a reset flip-flop produces a "1" at its 0 output terminal and a "0" at its 1 output terminal.

In the operation of the system of FIG. 15, a reset signal is first applied to the reset terminals of all flip-flops. Then, a binary word which describes the symmetric switching function desired is applied to the set terminals of the flip-flop. This binary word may be synchronized with the input signals $x_1$–$x_7$ applied to block 50. If the input word has the values 010101 as shown in FIG. 15, the network implements the odd parity function just like the one of FIG. 11. This input word causes a "1" to be applied to switches 81, 92, 93 and 94 closing these switches. This means that a "0" is applied from the 0 line through closed switches to gates 60, 62, 64 and 66. On the other hand, a "0" is applied to switches 83, 95, 96 and 97 opening these switches and disconnecting the 0 line from gates 61, 63, 65 and 66. In the same manner, switches 80, 98, 100 and 102 have "0" applied opening these switches and disconnecting the "1," $M_2$, $M_4$, and $M_6$ lines from their respective gates. The remaining switches 82, 103, 104 and 105 all have a "1" applied from their respective flip-flops and are therefore closed. These switches permit the $M_1$, $M_3$, $M_5$ and $M_7$ signals to be applied to the respective gates.

Figure 12:
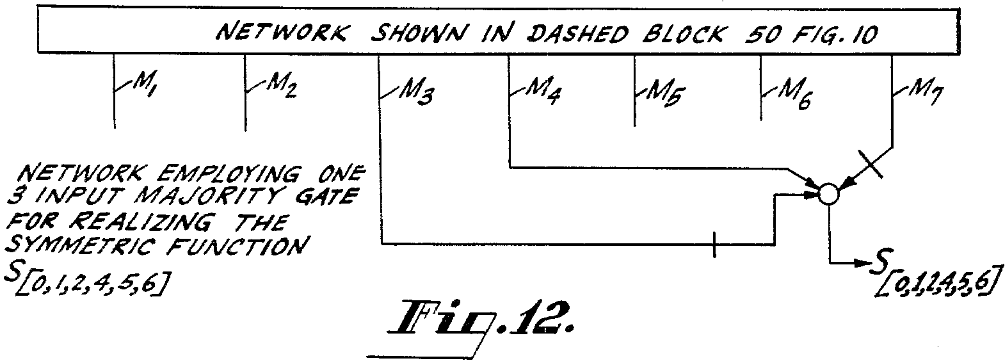
FIG. 12 is a diagram of another network according to the present invention for realizing still another symmetric function.

The network of FIG. 12 realizes the symmetric switching function $S_{0,1,2,4,5,6}(x_1, \ldots x_7)$. Equation 19 indicates that this function can be written as $$S_{0,1,2,4,5,6}=M_0\overline{M}_3 v M_4\overline{M}_7 \quad (23)$$

Since $M_0=1$ (see the remarks preceding Equation 12*a*), Equation 23 can be written as follows:

$$S_{0,1,2,4,5,6}=\overline{M}_3 v M_4\overline{M}_7 \quad (24)$$

The function expressed in Equation 24 can be realized with a single three input majority gate receptive of the signals $\overline{M}_3$, $M_4$ and $\overline{M}_7$ as shown in FIG. 12. The justification for this realization is similar to that given for the cascade realization of FIG. 9.

Figure 13:
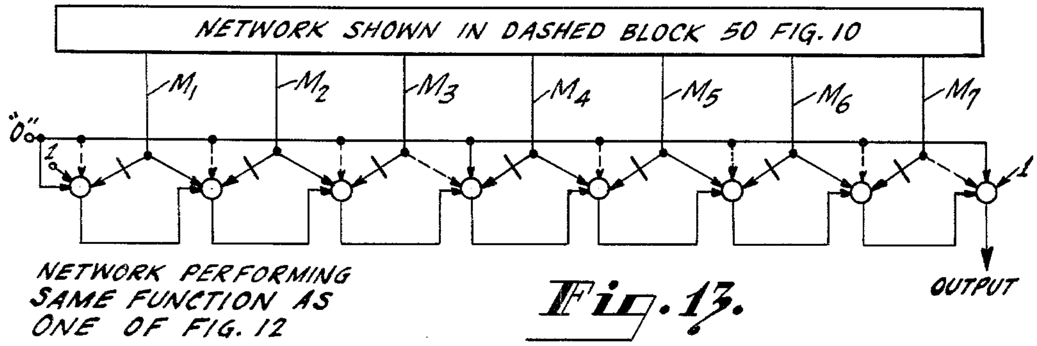
FIG. 13 is a second type of network for performing the same function as the network of FIG. 12.

The network of FIG. 13 realizes the same function as the network of FIG. 12 but is based on a regular cascade array that is manufactured in accordance with the deletion technique already described. The design specification chart for this symmetric function is shown in FIG. 14*b*. This chart indicates that the 0 connection must be deleted from the zero'th, first, second, fourth, fifth and sixth gates. The M connection must be deleted from the third and seventh gates.

The network of FIG. 15 may be employed to realize the same switching function as the networks of FIGS. 12 and 13. The binary word which must be applied to the flip-flops is 11101110.

In the claims which follow, the expression $$S_{[j\leq t\leq j+m_1,\ k\leq t\leq k+m_2,\ \cdots\ p\leq t\leq p+m_q]}$$

is a general expression for a symmetric switching function S of $n$ arguments with $q$ ranges of consecutive numbers $j$ to $j+m_1$, $k$ to $k+m_2$, . . . $p$ to $p+m_q$. The foregoing small letters, including $n$, are all integers. An expression such as $j\leq t\leq j+m_1$ refers to one range of consecutive numbers of arguments from $j$ arguments through $j+m_1$ arguments, where $t$ denotes the actual integers within the range $j$ to $j+m_1$, inclusive. The complete expression above for S calls for the symmetric switching function S to have the value 1 when the number of arguments which have the value 1 is any one of $j$, $j+1$, $j+2$, . . . $j+m_1$, or $k$, $k+1$, $k+2$, . . . $k+m_2$ and so on.

The meaning of the expression can perhaps more clearly be understood in terms of the following specific examples. In the first example $n$, the number of arguments, equals 28. The expression $$S_{[1\leq t\leq 3,\ 4\leq t\leq 8,\ 9,\ 24\leq t\leq 25]}$$

says that S has the value 1 when any 1, 2 or 3 of its 28 arguments have the value 1 or when any 4, 5, 6, 7, or 8 of its 28 arguments have the value 1, or when any 9 of its 28 arguments have the value 1, or when any 24 or 25 of its 28 arguments have the value 1. In this case, $q$, the number of ranges of consecutive numbers, is four.

As a second specific example in which $q$, the number of ranges, is 2 and which, $n$ is 9, the expression is $$S_{[2\leq t\leq 5,\ 7\leq t\leq 8]}$$

This expression says that S has the value 1 when any 2 or 3 or 4 or 5 of its 9 arguments have the value 1 or when any 7 or 8 of its 9 arguments have the value 1.

In the claims which follow, the capital letter M followed by a subscript represents a particular threshold function of $n$ arguments. For example, $M_j$ means that M has the value 1 when at least $j$ of its $n$ arguments have the value 1; otherwise it has the value 0. $M_k$ means that M has the value 1 when at least $k$ of its $n$ arguments have the value 1 otherwise it has the value 0. $j$ and $k$ in the expressions above are integers which represent some number not more than $n$ of arguments. $\overline{M}$ represents a complementary threshold function. For example, $\overline{M}_{j+m_1+1}$ means that if at least $j+m_1+1$ of the $n$ arguments of the function are 1, then $\overline{M}$ equals 0. Put differently, $\overline{M}_{j+m_1+1}$ means that if less than $j+m_1+1$ of the $n$ arguments are 1, then $\overline{M}$ is 1. In this expression, $j$ and $m_1$ are both integers and $j+m_1+1$ is an integer representing some number of arguments not more than $n$ of the arguments.

What is claimed is:

1. A network for realizing a symmetric switching function comprising a network of majority gates responsive to input signals indicative of binary arguments of said function for producing output signals indicative of threshold functions of said arguments and complements of threshold functions of said arguments; and a plurality of majority gates for logically combining said output signals to produce a signal indicative of said symmetric switching function.

2. A network for realizing a symmetric switching function comprising a network of majority gates responsive to input signals indicative of binary arguments of said function for producing output signals indicative of threshold functions of said arguments and complements of threshold functions of said arguments; and a plurality of majority gates connected in cascade and each receiving at least one of said output signals for logically combining said output signals to produce a signal indicative of said symmetric switching function.

3. A network for realizing a symmetric switching function comprising a network of majority gates responsive to input signals indicative of binary arguments of said function for producing output signals indicative of threshold functions of said arguments and complements of threshold functions of said arguments; and a plurality of majority gates some connected to operate as "and" gates and others connected to operate as "or" gates for logically combining said output signals to produce a signal indicative of said symmetric switching function.

4. A network for realizing a symmetric switching function $$S_{[j\leq t\leq j+m_1,\ k\leq t\leq k+m_2,\ \cdots\ p\leq t\leq p+m_q]}$$

of $n$ arguments comprising means for generating signals indicative of the threshold functions $M_j, M_k \ldots M_p$ of said $n$ arguments and the complementary threshold functions $\overline{M}_{j+m_1+1}, \overline{M}_{k+m_2+1} \ldots \overline{M}_{p+m_q+1}$ of said $n$ arguments; and means for logically combining said signals to produce a signal indicative of said symmetric switching function, where $j, m_1, m_2, m_q, k, p, t$ and $n$ are all integers.

5. A network for realizing a symmetric switching function $$S_{[j\leq t\leq j+m_1,\ k\leq t\leq k+m_2,\ \cdots\ p\leq t\leq p+m_q]}$$

of $n$ arguments comprising means for generating signals indicative of the threshold functions $M_j, M_k \ldots M_p$ of said $n$ arguments, and the complementary threshold functions $\overline{M}_{j+m_1+1}, \overline{M}_{k+m_2+1} \ldots \overline{M}_{p+m_q+1}$ of said $n$ arguments; and means for logically combining said signals in the following manner: $M_j\cdot\overline{M}_{j+m_1+1} v M_k\cdot\overline{M}_{k+m_2+1} \ldots vM_p\cdot\overline{M}_{p+m_0+1}$, to produce a signal indicative of said symmetric switching function, where $j, m_1, m_2, m_q, k, p, t$ and $n$ are all integers.

6. A network for realizing a symmetric switching function $$S_{[j\leq t\leq j+m_1,\ k\leq t\leq k+m_2,\ \cdots\ p\leq t\leq p+m_q]}$$

of $n$ arguments comprising means for generating signals indicative of the threshold functions $M_j, M_k \ldots M_p$ of said $n$ arguments, and the complementary threshold functions $\overline{M}_{j+m_1+1}, \overline{M}_{k+m_2+1} \ldots \overline{M}_{p+m_0+1}$ of said $n$ arguments; and means for logically combining said signals to produce a signal indicative of said symmetric switching function, said means including $n+1$ three input majority gates, the zero'th, and $n$'th gates receiving as one input a signal indicative of the binary bit "one," and as a second input signals indicative of $\overline{M}_1$ and $M_n$, respectively, each remaining $i$'th gate receiving as inputs signals indicative of $M_i$ and $\overline{M}_{i+1}$, all gates receiving as a third input a signal indicative of the binary bit "zero," the zero'th gate receiving as a fourth input another signal indicative of the binary bit "zero," and each $i$'th gate except the $n$'th gate receiving as a fourth input the output of the $i$—1 gate, a selected input to each of the $n$ gates being disconnected from its gate, and the output of said $n$'th gate comprising the output of said network, where $j, m_1, m_2, m_q, k, p, t$ and $n$ are all integers.

7. In combination, means supplying signals indicative of threshold functions of $n$ arguments and signals indicative of complements of threshold functions of said $n$ arguments; a network which receives said signals for realizing a symmetric switching function of said $n$ arguments; and means for supplying control signals to said network for selecting the one of the symmetric switching functions to be realized by said network, where $n$ is an integer.

8. In combination, a first network of three input majority gates responsive to input signals indicative of $n$ arguments for producing signals indicative of threshold functions of $n$ arguments and signals indicative of complements of threshold functions of said $n$ arguments; a network of $n+1$, three input majority gates, which receives the signals produced by the first network for realizing a symmetric switching function of said $n$ arguments; and means including a plurality of electronic switches responsive to signals indicative of an $n+1$ bit binary word for causing the second mentioned network to implement a desired one of the symmetric switching functions which can be realized by said network, where $n$ is an integer.

9. A network for realizing a symmetric switching function $$S_{[j\leq t\leq j+m_1,\ k\leq t\leq k+m_2,\ \cdots\ p\leq t\leq p+m_q]}$$

of $n$ arguments comprising means for generating signals indicative of the threshold functions $M_j, M_k \ldots M_p$ of said $n$ arguments, and the complementary threshold functions $\overline{M}_{j+m_1+1}, \overline{M}_{k+m_2+1} \ldots \overline{M}_{p+m_q+1}$ of said $n$ arguments; and means for logically combining said signals to produce a signal indicative of said symmetric switching function, said means including $n+1$ three input majority gates, the zero'th and $n$'th gates receiving as one input a signal indicative of the binary bit "one," and as a second input signals indicative of $\overline{M}_1$ and $M_n$, respectively, each remaining $i$'th gate receiving as inputs signals indicative of $M_i$ and $\overline{M}_{i+1}$, all gates receiving as a third input a signal indicative of the binary bit "zero," the zero'th gate receiving as a fourth input another signal indicative of the binary bit "zero," and each $i$'th gate except the $n$'th gate receiving as a fourth input the output of the $i$—1 gate, means for disconnecting one of two particular inputs to each of the $n$ gates, said two inputs consisting of the binary bit "zero" input and the M input for all gates except the zero'th gate where the two inputs consist of the binary bit "zero" input and the binary bit "one" input, and the output of said $n$'th gate comprising the output of said network, where $j, m_1, m_2, m_q, k, p, t$ and $n$ are all integers.

10. A network as set forth in claim 9 wherein said means for disconnecting comprises $2(n+1)$ electronic switches, two for each of the $n+1$ gates.

References Cited by the Examiner

UNITED STATES PATENTS

| | | | |
|---|---|---|---|
| 2,603,746 | 7/1952 | Burkhart et al. | 307—88.5 |
| 2,712,065 | 6/1955 | Elbourn et al. | 328—95 |
| 2,848,607 | 8/1958 | Maron | 328—95 |
| 3,036,222 | 5/1962 | Witt | 307—88.5 |
| 3,106,699 | 10/1963 | Kamentsky | 307—88.5 |

OTHER REFERENCES

IBM Technical Disclosure Bulletin, vol. 1, No. 6, April 1959, "Parity Check Circuit," pages 9–10.

DAVID J. GALVIN, *Primary Examiner.*

ARTHUR GAUSS, *Examiner.*